United States Patent [19]

Eden

[11] Patent Number: 4,637,008

[45] Date of Patent: Jan. 13, 1987

[54] OPTICAL ERASABLE DISK MEMORY SYSTEM UTILIZING DURATION MODULATED LASER SWITCHING

[75] Inventor: Dayton D. Eden, Dallas, Tex.

[73] Assignee: LTV Aerospace and Defense, Dallas, Tex.

[21] Appl. No.: 599,470

[22] Filed: Apr. 12, 1984

[51] Int. Cl.$^4$ ............................ G11B 7/00; G11B 7/22
[52] U.S. Cl. ...................................... 369/100; 369/284; 369/286; 369/111; 365/113
[58] Field of Search ............... 369/100, 284, 288, 286, 369/111; 365/113; 346/76 L, 135.1, 1.1

[56] References Cited

U.S. PATENT DOCUMENTS

| | | | |
|---|---|---|---|
| 3,778,785 | 12/1973 | Von Gutfeld | 365/113 |
| 3,789,420 | 1/1974 | Claytor et al. | 346/1.1 |
| 3,789,421 | 1/1974 | Chivian et al. | 346/1.1 |
| 4,125,860 | 11/1978 | Ishii et al. | 369/111 |
| 4,314,262 | 2/1982 | Reilly | 346/76 L |
| 4,322,839 | 3/1982 | Yamashita et al. | 369/288 |
| 4,371,954 | 2/1983 | Cornet | 365/113 |
| 4,385,376 | 5/1983 | Takaoka et al. | 369/288 |

FOREIGN PATENT DOCUMENTS

| | | | |
|---|---|---|---|
| 2408010 | 10/1974 | Fed. Rep. of Germany | 365/113 |
| 1486271 | 9/1977 | United Kingdom . | |

OTHER PUBLICATIONS

Chaudhari, "Optical Memory", vol. 16, No. 2 Jul. 1973, IBM Tech. Dis. Bulletin.
D. W. Pohl et al., "Laser-Induced Phase Transition in the Surface of SmS Crystal", Applied Optics, vol. 13, No. 1, Jan./1974, pp. 95-97.
Von Gutfeld "Structures for Reversible SmS Optical Memories", IBM Tech. Dis. Bulletin, vol. 16, No. 1, 6/73, pp. 108-109.

Primary Examiner—Raymond F. Cardillo
Assistant Examiner—Hoa T. Nguyen
Attorney, Agent, or Firm—J. M. Cate; S. S. Sadacca

[57] ABSTRACT

An optical erasable disk memory system which utilizes duration modulated laser switching is disclosed. The disk storage system utilizes a disk-shaped storage medium which includes a planar substrate and a thin film of phase change material. A substantially transparent optical tuning layer and protective layer are also utilized in the preferred embodiment of the present invention. The phase change material utilized is sensitive to both stress and temperature variations and will change from a first optically discernible phase to a second optically discernible phase at any portion thereof subjected to a temperature in excess of a selected threshold temperature at a particular stress and will change from the second phase back to the first phase at any portion thereof subjected to a stress in excess of a selected threshold stress at a particular temperature. A duration modulated laser is selectively utilized to heat particular portions of both the planar substrate and the thin film of phase change material to increase the temperature of the phase change material above the threshold temperature at those portions. A shorter duration laser pulse is utilized to heat selected portions of the phase change material without permitting the heat to dissipate into the substrate. The heated phase change material expands at a greater rate than the non-heated planar substrate and thereby increases the stress at those selected portions to a stress above the selected threshold stress.

11 Claims, 3 Drawing Figures

OPTICAL ERASABLE DISK MEMORY SYSTEM UTILIZING DURATION MODULATED LASER SWITCHING

BACKGROUND OF THE INVENTION

This invention relates to optical data storage systems in general and in particular to optical data storage systems which can both record and read optically discernible data from a storage disk. Still more particularly, this invention relates to optical data storage systems in which the data can be selectively erased.

Optical data storage systems are well known in the art. The so-called "video disk" or "laser disk" systems known in the art are excellent examples of the impact of this technology in the marketplace. The optical systems utilized in these disks operate by focusing a laser on a rapidly rotating disk and reflecting light from the surface of the disk. The position of the laser may be accurately controlled utilizing a complex servo tracking system and the amount and characteristics of the light reflected from selected portions of the disk can be utilized to encode a large amount of digital data. The disks utilized with such systems are quite low in manufacturing costs and typically are constructed by ablating, stamping or burning small pits into the surface of each disk. By utilizing a laser beam to detect the presence or absence of these pits, there is no mechanical connection between a stylus and the disk and therefore no stylus or disk wear. Additionally, a particular section of the data encoded may be accessed in a relatively short period of time and, in the case of an encoded television picture, a particular frame may be repeatedly accessed to provide a "freeze-frame" effect without adversely affecting either the disk or the stylus.

One shortcoming associated with optical disk data storage systems known in the art is that the typical system available in the marketplace can only be utilized to read data which has been imprinted on a disk at a manufacturing facility. Recently, newer systems have been proposed which can both read and write data onto a disk. These known systems typically use a laser at a slightly higher power level to ablate, burn or blister the disk surface and thereby provide a variation in the amount of light which can be reflected from the disk. While this system represents an advance in the art, it suffers from a shortfall in that the information recorded on the disk in this manner is permanently recorded and may not be erased.

In an effort to overcome this deficiency of known optical disk system, several approaches have been proposed. In a first approach, a disk covered with a layer of certain rare earth materials is subjected to a magnetic field and then magnetized at selected point by heating those points to a point above the Curie temperature of the material by means of a laser. The absence or presence of magnetization in particular areas of the disk can then be detected by reflective reading with a polarized light source and by detecting the slight rotation of light caused by the Faraday effect.

A second approach which has been proposed utilizes materials which can be changed from an amorphous to a polycrystalline state by utilization of a selected wavelength laser. The light from a different wave length laser reflected from a particular portion of each disk can then be utilized to determine whether that portion of the disk material is in its crystalline or amorphous state.

Both of the aforementioned systems suffer from severe deficiencies in actual applications. The magneto-optic approach requires the utilization of polarized light and is limited in both writing speed and recorded signal-to-noise ratio and the second approach necessitates the utilization of two different wave length lasers.

Recently, systems have been proposed for utilizing thermochromic phase change materials to store optically discernible digital data. Although this approach demonstrates certain advantages over previously enumerated systems, there have been difficulties encountered in attempting to maintain the accuracies required in this work. Examples of this early work may be seen in U.S. Pat. Nos. 3,789,420 and 3,789,421.

Therefore, it should be apparent that there has existed a need for an optical disk data storage system which can both read and write data and which may be selectively erased. Further, such an optical disk data storage system should be fully compatible with existing magnetic disk memory systems.

SUMMARY OF THE INVENTION

It is therefore one object of the present invention to provide an improved optical data storage disk system.

It is another object of the present invention to provide an improved optical data storage disk which permits erasure of stored data.

It is yet another object of the present invention to provide an improved an optical data storage which permits selective erasure of portions of the stored data.

It is another object of the present invention to provide an improved optical data storage disk system which permits both reading and recording of digital data utilizing a single laser.

It is still another object of the present invention to provide an improved optical read/write data storage disk which may be inexpensively manufactured.

The foregoing objects are achieved as is now described. The disk storage system of the present invention utilizes a disk shaped storage medium which includes a planar substrate and thin film of phase change material. A substantially transparent optical tuning layer and protective layer are also utilized in the preferred embodiment of the present invention. The phase change material utilized is sensitive to both stress and temperature variations and will change from a first optically discernible phase to a second optically discernible phase at any portion thereof subjected to a temperature in excess of a selected threshold temperature at a particular stress and will change from the second phase back to the first phase at any portion thereof subjected to a stress in excess of a selected threshold stress at a particular temperature. A duration modulated laser is selectively utilized to heat particular portions of both the planar substrate and the thin film of phase change material to increase the temperature of the phase change material above the threshold temperature at those portions. A shorter duration laser pulse is utilized to heat selected portions of the phase change material without permitting the heat to dissipate into the substrate. The heated phase change material expands at a greater rate than the non-heated planar substrate and thereby increases the stress at those selected portions to a stress above the selected threshold stress.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
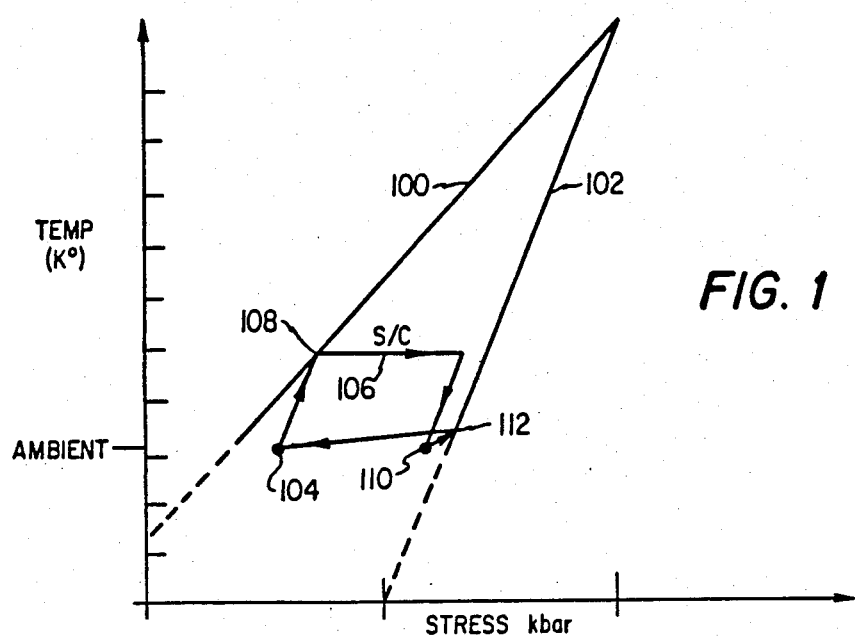
FIG. 1 is a phase diagram of the phase change material utilized in the novel disk memory systems of the present invention.

With reference now to the figures and in particular with reference to FIG. 1, there is depicted a phase diagram for the phase change material utilized in the novel disk memory system of the present invention. The phase change material utilized in a preferred embodiment of the present invention is one of the rare earth monochalcogenides, such as samarium sulfide; however, samarium selenide, samarium telluride or samarium oxide may also be utilized as well as certain gadolinium or lanthinium compounds. Each of these materials exhibits a well documented optical phase change from a semiconductor state to a metallic state and from the metallic state back to the semiconductor state when subjected to selected temperatures and stresses. Of course, those skilled in the art will appreciate that these materials also exhibit a hysteresis effect. That is, a phase change brought about by a transient stress or temperature will remain after that transient or temperature has been removed.

The phase diagram of FIG. 1 will be referred to throughout the specification and will prove helpful in an explanation of the present invention. The phase diagram of FIG. 1 is a diagram of the phase of a selected phase change material, such as samarium sulfide, graphed with stress along the horizontal axis and temperature along the vertical axis. As can be seen, the phase diagram of FIG. 1 can be said to be divided into three separate areas. That is, at any point above line 100, the selected phase change material is always in the semiconductor phase. At any point to the right of line 102, the selected phase change material is always in the metallic phase. The area between lines 100 and 102 represents the hysteresis region of these materials in that the phase of the material at those temperatures and pressures will depend upon the material's recent history. For example, if the phase change material was recently heated to a temperature above line 100 and then allowed to cool to a point below line 100, the material will remain in its semiconductor state. Similarly, if the material is subjected to a stress greater than the value at a point on line 102 and then released, the material will remain in its metallic state.

Figure 2:
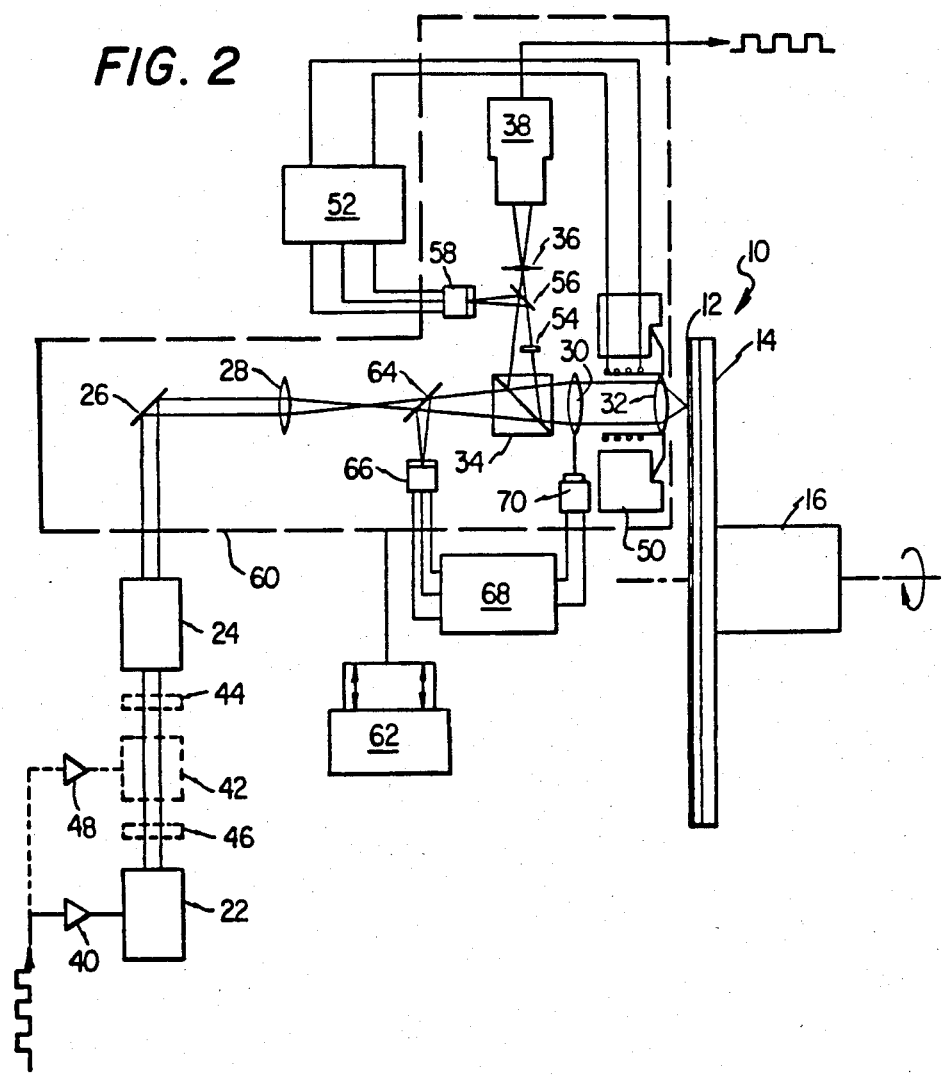
FIG. 2 is a partially diagramatic and partially schematic view of the major components of the optical erasable disk memory system of the present invention.

Referring now to FIG. 2, a partially diagrammatic and partially schematic view of the major components of the optical erasable disk memory system of the present invention is depicted which can be utilized in conjunction with FIG. 1 to illustrate the operation thereof. Optical erasable disk memory system 10 includes a storage disk 12 which is supported by turntable 14. In the depicted embodiment, turntable 14 includes a central shank 16 which is utilized to rotate turntable 14 at a selected rate of speed. The reading of optically discernible digital data stored on disk 12 is accomplished utilizing a laser 22 which is operated in a low power continuous wave manner and focused or collimated utilizing collimation optics 24. The beam of laser 22 is then reflected by mirror 26 and sharply focused utilizing lens 28, in a manner well known in the optical art. Condenser lens 30 and objective lens 32 are then utilized to focus the output of laser 22 on a selected portion of storage disk 12. As is well known in the laser disk art, the light reflected back from storage disk 12 can then be directed by means of a cube beam splitter 34 through pinhole 36 to optical detector 38. The output of optical detector 38 then represents a digital data stream which will vary according to the optical characteristics of selected portions of the surface of storage disk 12.

As will be explained in detail below, the "writing" of data onto storage disk 12 is accomplished by selectively and temporarily raising the temperature or stress experienced at selected portions of the surface of storage disk 12 above preselected temperature and stress thresholds. This is accomplished by utilizing laser 22 at a higher power level and for varied durations to temporarily heat small portions of the surface of storage disk 12. The output of laser 22 can be modulated directly by utilizing the output of amplifier 40 to vary the magnitude of the injection currents, when utilizing a solid state diode laser, or by modulating with amplifier 48 the voltage applied to a Pockels cell 42 when a continuous wave laser (e.g., HeNe laser) is utilized. As is common practice in this area, crossed polarizers 44 and 46 are utilized with Pockels cell 42 to produce a modulated beam output. This higher power modulated output of laser 22 may then be focused onto the surface of storage disk 12 to selectively heat portions of the disk's surface as small as one micron in diameter.

The proper focus of objective lens 32 may be maintained by affixing objective lens 32 to a movable diaphragm of focus head 50 and by varying the current applied to a coil within focus head 50. The magnitude and polarity of the current applied to focus head 50 may be determined by the output of differential amplifier 52 in the following manner. A portion of the reflected beam output of cube beam splitter 34 is obscured by beam obstructor 54 and the thus obscured beam is then applied to beam splitter 56, which reflects the focused beam between the two elements of bi-element optical detector 58. Any movement of objective lens 32 away from the proper focus will then cause the focused beam reflected by beam splitter 56 to blur onto one of the two elements of bi-element optical detector 58, generating an input to differential amplifier 52.

Tracking along the digital data recorded on storage disk 12 may be accomplished utilizing both a coarse and vernier position translator. The entire write/read optical head assembly, as included within dash line 60, is movable by means of radial position translator 62. For vernier translation, a portion of the beam is deflected utilizing beam splitter 64 and is focused on to a second bi-element optical detector 66. As above, the output of bi-element optical detector 66 is utilized to drive differential amplifier 68 and the output of differential amplifier 68 is utilized to provide a selected magnitude and polarity of current to lens translator 70. Lens translator 70 is then utilized to move translatable condenser lens 30 which causes proper tracking of the optically discernible data.

Figure 3:
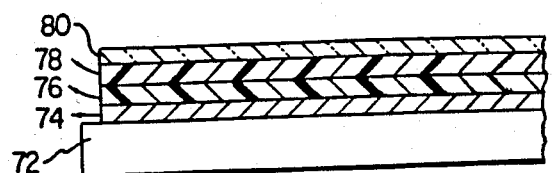
FIG. 3 is a sectional of one embodiment of the optical erasable disk of the present invention.

Referring now to FIG. 3, there is depicted a sectional view of one embodiment of novel erasable optical read/write data storage disk 12 of the present invention. Disposed above base member 72 is a planar substrate 74. Planar substrate 74 is preferably constructed utilizing a thin layer of a material having a thermal coefficient of expansion which differs from the thermal coefficient of expansion of the phase change material utilized. Suitable examples of such materials are fused quartz or sapphire. In the depicted embodiment of the present invention, planar substrate 74 is heated to a selected temperature and expands slightly in response to the application of that heat. Next, a thin film of phase change material 76 is applied to planar substrate 74. Film 76 may be applied by utilizing standard vapor deposition techniques to lay a thin film of samarium sulfide on top of planar substrate 74. After deposition of thin film 76, substrate 74 and film 76 are permitted to cool. The difference in thermal coefficients of expansion between substrate 74 and film 76 will cause substrate 74 to shrink at a rate greater than film 76 and will thus provide a precise bias stress in film 76. At ambient temperatures, this bias stress will cause the phase change material to become stable at a selected point between lines 100 and 102 of FIG. 1, such as point 104.

Also depicted in FIG. 3 are certain additional films or layers which may be utilized to enhance the operation or efficiency of storage disk 12. For example, the dielectric optical tuning layer 78 may be selected to maximize the contrasts in reflectivity of the two phases of the phase change material chosen. Suitable tuning layer materials will vary with the precise phase change material chosen; however, two examples may be relatively transparent materials such as MgO or $MgF_2$. Additionally, a protective layer 80 may also be utilized to protect the surface of disk 12 during handling or storage.

Referring now to FIGS. 1, 2 and 3, the operation of optical erasable disk memory system 10 may be illustrated. A high power, long duration (approximately 20 nano seconds) pulse from laser 22 is applied to selected portions of film 76 of disk 12. Those portions are presumed to be stable at point 104 of FIG. 1 and in the metallic phase for purposes of this explanation. As film 76 and substrate 74 are heated, the temperature of those selected portions will exceed the threshold temperature represented by point 108 on line 100. As film 76 changes from its metallic state to its semiconductor state at line 100, film 76 will expand approximately fifteen percent in much the same manner that water will expand when it changes state into ice. This expansion will increase the stress experienced in film 76, as illustrated by line 106. After the high power, long duration laser pulse has been removed, film 76 will cool down to ambient temperature and become stable at point 110, in its semiconductor phase. In order to change selected portions of film 76 from the semiconductor phase to the metallic phase, it is necessary to increase the stress experienced at those selected portions to a value equal to the selected threshold stress represented by line 102 at the particular temperature experienced. This is accomplished by utilizing a high power, short duration laser pulse from laser 22 (approximately 2 nano seconds) which will effectively heat film 76 rapidly, without allowing a substantial amount of heat to dissipate into substrate 74. As film 76 is heated in this manner, it will expand, increasing the stress experienced at those selected portions of film 76. The slope of the line which intersects line 102 at point 112 is at variance with the slope of the other load lines in the phase diagram due to the transient nature of the heat applied to film 76 and the fact that substrate 74 is not heated along with film 76. At point 112 where the stress experienced at those selected portions intersects line 102, film 76 will contract approximately fifteen percent as it transitions into its metallic phase and will thus relax the stress present in those selected portions of film 76 to become stable at point 104 in the metallic phase.

In the manner explained herein, those ordinarily skilled in the art will appeciate that by utilizing a duration modulated laser to heat a thin film of phase change material along with its planar substrate or to merely heat the thin film of phase change material without heating the substrate beneath, it is impossible to increase the temperature of the thin film of phase change material to a point in excess of a selected threshold temperature at a particular stress or to increase the stress experienced at selected portions of the film of phase change material to a point in excess of a selected threshold stress at a particular temperature. This fact, coupled with the expansion and contraction of these phase change materials permits a single wave length laser operated at various durations to switch selected portions of a film of phase change material between two optically discernible phases. Of course, those ordinarily skilled in the art will appreciate that the phase diagram of FIG. 1 may altered by the addition of suitable dopant materials to the phase change material utilized and that the phase change diagram may thus be adapted to permit a switching between phases within preselected temperature ranges or stress ranges to enhance the efficiency of the resultant system.

Although the invention has been described with reference to a specific embodiment, this description is not meant to be construed in the limiting sense. Various modifications of the disclosed of the embodiment, as well as alternative embodiments of the invention, will become apparent to persons skilled in the art upon reference to the description of the invention. It is therefore contemplated that the appended claims will cover any such modifications or embodiments that fall within the true scope of the invention.

What is claimed is:

1. An erasable optical read/write data storage system comprising:
    a storage medium comprising:
        a planar substrate having a first coefficient of thermal expansion; and
        a thin film of phase change material disposed on said planar substrate, said phase change material having a second coefficient of thermal expansion and exhibiting an optically discernible phase change from a first phase to a second phase at any portion thereof subjected to a temperature in excess of a selected threshold temperature at a particular stress and from said second phase to said first phase at any portion thereof subjected to a stress in excess of a selected threshold stress at a particular temperature;
    means for generating a collimated laser beam of selected power and duration and means for focusing said laser beam on selected portions of said thin film of phase change material;
    said means for generating a collimated laser beam of a selected power and duration selects a first duration for increasing the temperature at a selected portion of said thin film of phase change material to a temperature in excess of said selected threshold temperature and for increasing the temperature of said planar substrate for placing said selected portion of said thin film in said first phase;

said means for generating a collimated laser beam of a selected power and duration selects a second duration less than said first duration for heating and expanding said selected portion of said thin film of phase change material without heating said planar substrate whereby said thin film of phase change material will expand thereby increasing the stress at said selected portion for changing the phase of said selected portion from said first phase to said second phase; and said means for generating a collimated laser beam of a selected power and duration selects said first duration for heating said selected portion of said thin film and said planar substrate for changing the phase of said selected portion from said second phase back to said first phase.

2. The erasable optical read/write data storage system of claim 1 wherein said storage medium includes a rigid metallic base disposed beneath said planar substrate.

3. The erasable optical read/write data storage system of claim 1 wherein said storage medium further includes an optical tuning layer disposed above said thin film of phase change material.

4. The erasable optical read/write data storage system of claim 1 wherein said storage medium further includes an optically transparent protective film disposed above said thin film of phase change material.

5. The erasable optical read/write data storage system of claim 1 wherein wherein said laser means comprises a solid state diode laser.

6. The erasable optical read/write data storage system of claim 1 wherein said laser means includes a plurality of electrically controllable optical lens devices.

7. The erasable optical read/write memory device according to claim 1 wherein said thin film of phase change material comprises a thin film of a rare earth monochalcogenide.

8. The erasable optical read/write memory device according to claim 7 wherein said thin film of phase change material comprises a thin film of samarium sulfide.

9. The erasable optical read/write memory device according to claim 1 wherein said planar substrate comprises a planar substrate of sapphire.

10. The erasable optical read/write memory device according to claim 1 wherein said planar substrate comprises a planar substrate of fused quartz.

11. The erasable optical read/write memory device according to claim 1 wherein said first coefficient of thermal expansion is greater than said second coefficient of thermal expansion.

* * * * *